Dec. 23, 1969
C. P. PORTERFIELD
3,485,987
MACHINING POWER SUPPLY FOR ELECTRICAL DISCHARGE MACHINING
Filed Nov. 1, 1962
3 Sheets-Sheet 1
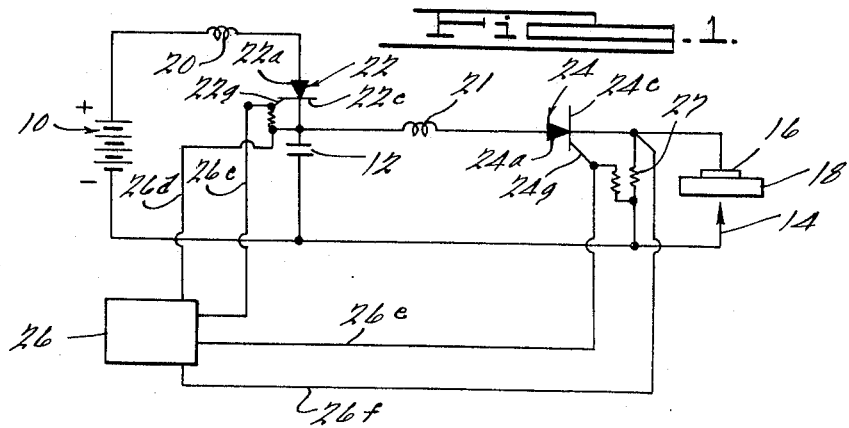
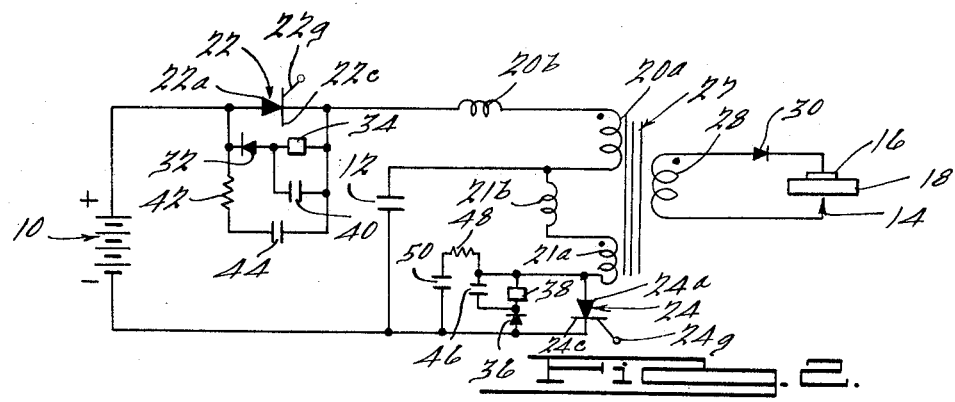
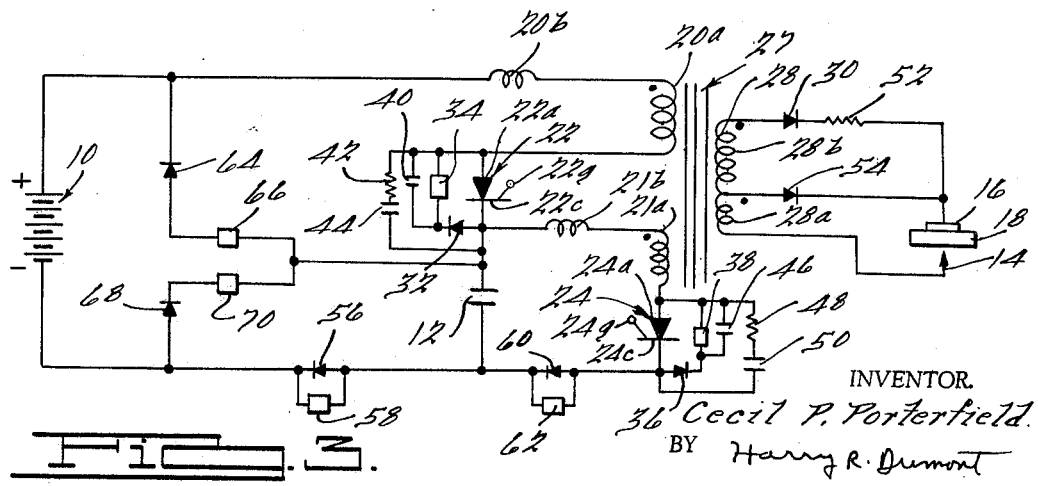
INVENTOR.
Cecil P. Porterfield
BY Harry R. Dumont
ATTORNEY.

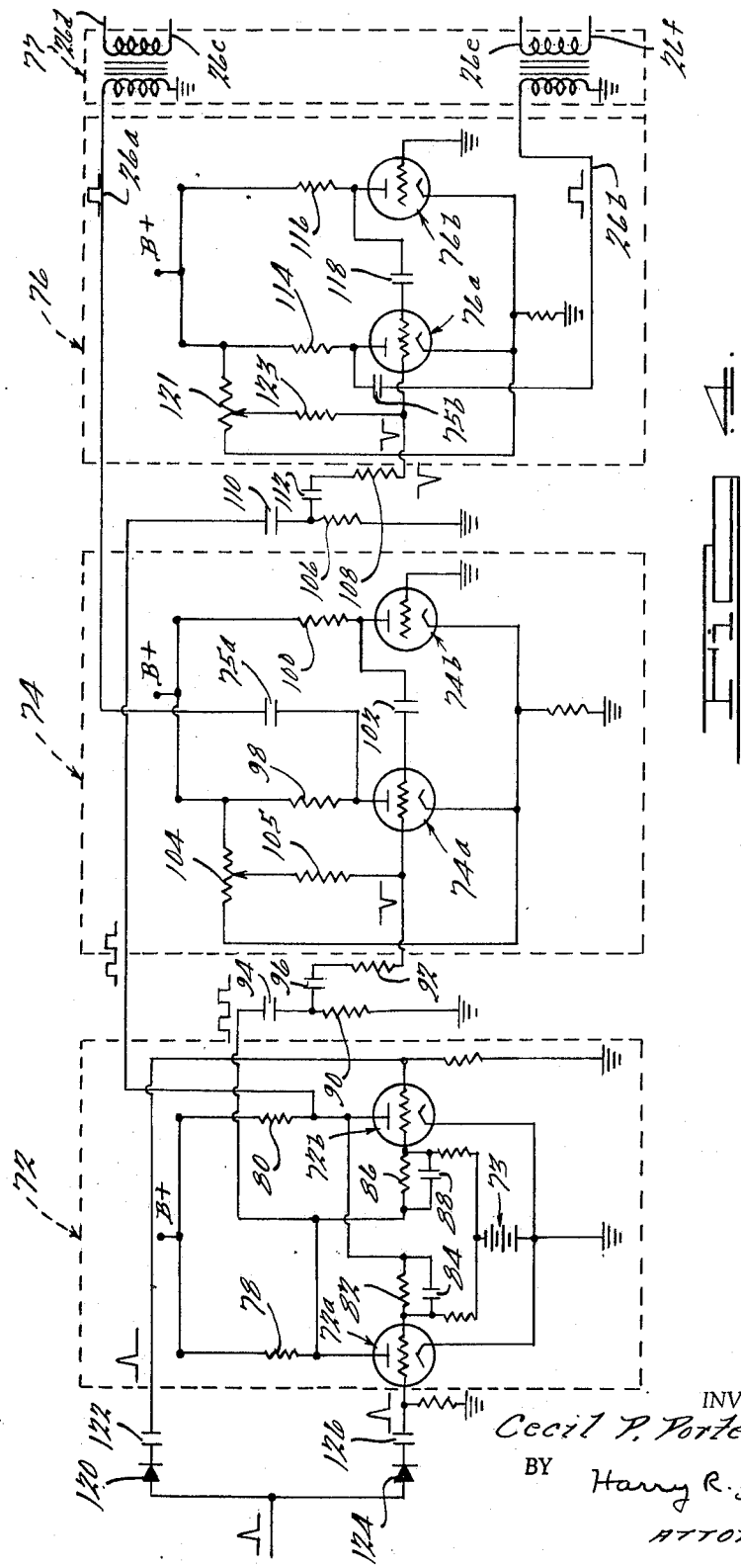

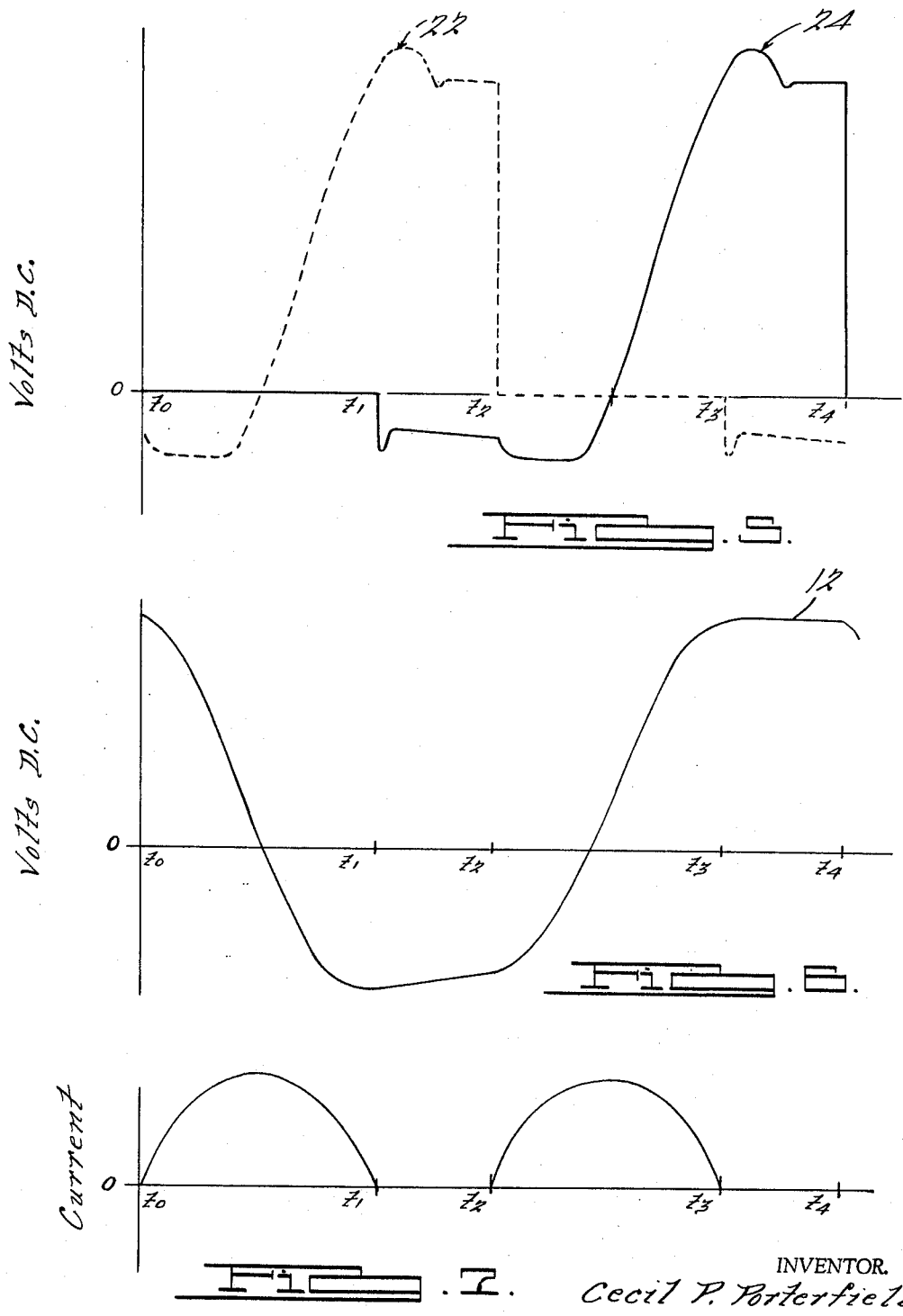

United States Patent Office 3,485,987
Patented Dec. 23, 1969

3,485,987
MACHINING POWER SUPPLY FOR ELECTRICAL DISCHARGE MACHINING
Cecil P. Porterfield, Davidson, N.C., assignor, by mesne assignments, to Elox Inc., Troy, Mich., a corporation of Delaware
Filed Nov. 1, 1962, Ser. No. 234,603
Int. Cl. B23k 11/24, 9/06
U.S. Cl. 219—69                                    16 Claims This invention relates generally to a power circuit of high current density, pulsed output, and, more particularly, to a machining power circuit for electrical discharge machining utilizing keyed, unidirectional switching means.

By electrical discharge machining is meant the process whereby a machining electrode is separated from a conductive workpiece by a dielectric filled gap in a manner well known in the art. By passing time-spaced current impulses of relatively high current magnitude and at relatively low voltage levels across the gap, the gap is ionized and particles are eroded from the workpiece by each successive impulse.

It is an object of this invention to provide an improved machining power circuit for electrical discharge machining which may be independently timed or cyclically operated in a positive switching manner.

It is an additional object of this invention to provide a machining power circuit for electrical discharge machining which has outstanding flexibility in control of discharge durations and currents with particular usefulness directed toward the employment of low melting point electrodes.

It is an additional object of this invention to provide a machining power circuit for producing machining pulses for electrical discharge machining utilizing semiconductor switching elements to permit an increased pulse repetition rate, yet to maintain it within carefully controlled limits.

It is a further object of this invention to provide a clipper stabilized machining power circuit of the pulse transformer type with a modification of the transformer to provide increased operating efficiency.

It is a further object of this invention to provide a power circuit of high efficiency for producing a precisely controlled, high current density, pulsed output where the energy content of all pulses is substantially identical.

It is a still further object of this invention to provide a machining power circuit for electrical discharge machining particularly adapted to provide uniformly spaced cutting pulses containing substantially identical amounts of electrical energy to insure production of a uniform and regular surface finish on the workpiece.

In accordance with the foregoing and other objects, the present invention, first briefly described, includes a source of operating direct current voltage, an energy storage means including a capacitor coupled across the source with a machining electrode and workpiece effectively connected in the charge and discharge leads of the capacitor and with the machining electrode spaced from the workpiece by a dielectric filled gap. A capacitor is provided first with a pair of unidirectional switching means, each connected to a common plate of the capacitor and effectively connected in the separate charge and discharge leads of the capacitor, together with means for alternately activating, that is, rendering conductive the first and second switching means in a phased relationship with the charging and discharging of the capacitor, respectively.

In accordance with the foregoing objects and first brief statement of the invention, the operation of the present invention will appear more clearly from the following detailed description and drawings which illustrate a preferred embodiment of the inventive idea together with several modifications of the basic concept in which:

FIGURE 1 is a schematic showing the basic operating elements of a machining power circuit;
FIGURE 2 shows the basic circuit as desirably modified by the incorporation of a pulse transformer;
FIGURE 3 is a further and preferred modification of the basic circuit and of the circuit of FIGURE 2 in which provision is made for a clipping level control across the capacitor to maintain a relatively constant DC energy storage level and to provide energy recovery;
FIGURE 4 is a schematic of keying pulse source shown in block form and indicated by the numeral 26 in FIGURE 1; and
FIGURES 5–7 are voltage waveforms illustrating the mode of operation of critical elements in the circuit of FIGURE 3.

Referring to the drawings, FIGURE 1 shows a source of direct current potential as a battery 10 with polarity as indicated. It will be appreciated that the supply source may as well be an alternating current potential including conventional unidirectional conductors or rectifiers. An energy storage means herein embodied as a capacitor 12 is connected across battery 10 and across the machining gap which includes machining electrode 14, the opposed electrode 16 and conductive workpiece 18. The spark gap is filled with a dielectric fluid which is ionizable by machining power pulses in a manner well known in the electrical discharge machining art to erode or machine the complementary shape of the selectively shaped electrode 14 in the workpiece 18. The polarity of the electrode 14 is normally negative relative to that of the workpiece 18. Connected in series between the positive terminal of battery 10 and capacitor 12 is a charging impedance shown as inductance 20. Connected in the discharge lead from capacitor 12 to the gap is a second inductance 21. Connected in the charge and discharge leads of capacitor 12 are unidirectional switching means of a semiconductor type indicated as controlled rectifiers 22 and 24. The circuit may likewise be completed by incorporating in it known types of grid triggering devices such as thyratrons, ignitrons or hard tube switching devices. Hard tube switching devices are the preferred type of switching means for high frequency operation. It has been found that controlled rectifiers of the semiconductor type provide a particularly satisfactory switching device in a circuit of the type that utilizes high current levels. Controlled rectifiers 22 and 24 are commercially available semiconductor devices each of which has an anode, a cathode, and a gating electrode, appropriately lettered *a*, *c*, and *g*, respectively. In the operation of the controlled rectifier, the voltage in the controlled rectifier is blocked in the forward direction below a critical breakdown voltage. Upon receipt of a proper gate signal, or by exceeding the critical breakdown voltage, the controlled rectifier will rapidly switch from a normally non-conductive to a conductive state. The controlled rectifier is capable of switching high currents with a forward voltage drop of the order of only 0.8 to 1.2 volts. The low forward resistance characteristic of the controlled rectifier in its conductive condition allows it to pass high values of current without the generation of excessive heat. Once the controlled rectifier is made conductive, it will remain in that state until the current passing through it falls to zero. It can be made non-conductive either by disconnecting the controlled rectifier from its current source or by reversing the voltage across the anode-cathode terminals of the controlled rectifier. It has been found that the controlled rectifier will change from a conductive to a non-conductive state more rapidly if the voltage across its anode-cathode is caused to reverse than if it is disconnected from its current source. The circuit I suggest takes advantage of this characteristic. To provide the appropriate gating signals, keying pulses are applied to the gates 22g and 24g and cathodes 22c and 24c of controlled rectifier 22 and 24, respectively, from a source of keying controlled pulses 26. Keying control pulses to the controlled rectifiers 22 and 24 are applied 180° out of phase with each other through output leads 26c and 26d to controlled rectifier 22 and through output leads 26e and 26f to controlled rectifier 24. It will be noted that the keying pulses are always much shorter in time duration than the charge time for capacitor 12 as determined by the valve of inductance 20 and capacitor 12 and shorter in time duration than the discharge time as determined by the values of inductance 21 and capacitor 12. The source of keying pulses 26 may be provided by a variety of circuits, as for example, through a suitable amplifier and square wave generator as will be shown and described in FIGURE 4, hereinafter. The gap has connected across it a resistor 27, so that, in a manner to be described hereinafter, a relatively large voltage drop is provided between electrode 14 and workpiece 18 to assist in the initial ionization of the gap.

FIGURE 2 shows a desired modification of the present invention in which controlled rectifier 22 charges capacitor 12 in series with inductance 20 after the manner of FIGURE 1. Controlled rectifier 24 discharges capacitor 12 through inductance 21 whose value is made equal to that of inductance 20. In FIGURE 2, inductances 20a and 21a are incorporated as equal turn primary windings of a pulse transformer 27 whose secondary 28 is preferably connected across the gap in series with a diode 30 to facilitate passage of the unidirectional machining pulse to the gap. The numerals 20b and 21b are employed to indicate uncoupled inductances present in the circuit to promote pulse transformer operation in non-saturating, high frequency mode. The winding inductances 20a and 21a are connected in a series adding relationship and have a like phasing with controlled rectifiers 22 and 24. Connected across controlled rectifier 22 is an oppositely poled diode 32 and a non-linear resistance cell 34. Similarly connected across controlled rectifier 24 is a diode 36 and a non-linear resistance cell 38. Non-linear resistance cells are well known in the electronic art and provide a non-linear resistance in that current increases through the cell as an exponential power of the voltage across it. Such cells are typically represented by the commercial silicon carbide product currently available and marketed as "thyrite" resistors by the General Electric Company and for which the higher-than-unity exponent is a plural number in the vicinity of four or higher. Also, controlled rectifiers 22 and 24 are paralleled by RC combination 42–44–40 and 48–50–46, respectively. The purpose of the protective networks above described across controlled rectifiers 22 and 24 is to prevent a transient spike of inverse voltage from appearing across these controlled rectifiers at the beginning or the end of their driven or conductive states.

FIGURE 3, which shows still further modification over the circuits of FIGURES 1 and 2, represents a preferred embodiment of the present invention. Included are the protective networks referred to in connection with FIGURE 2 whose purpose is to short circuit the voltage transients that normally appear across controlled rectifiers 22 and 24 at the instant they transfer between the conductive and the non-conductive mode. The effectiveness of this particular protective network has been amply demonstrated in practice where it was found that voltage transients ranging as high as 1,000 volts were reduced to 50 volts or less. A significant modification has been made in that portion of the circuit designed to deliver the machining pulse to the gap. Secondary winding 28 is comprised of two series aiding windings. Winding 28a delivers machining current after gap ionization and winding 28b provides a source of low current, at a relatively higher voltage to insure gap ionization. A series current limiting resistor 52 is included between diode 30 and the gap. Diode 30 thus is adapted to deliver only small values of current to the gap but to provide a voltage set to a selected magnitude greater than the potential required to ionize the gap and of a value to assure gap ionization early in the current impulse. Diode 54 is connected to the gap at a transformer potential point sufficient to maintain ionization of the gap. This arrangement is designed to provide a maximum flow of current through the gap after ionization. It will be appreciated, that by a modification apparent to those skilled in the art, transformer 27 might alternately be replaced by two or more transformers with their primary windings corresponding to windings 20a and 21a and each with a secondary winding similar to 28, these windings connected in parallel to a machining electrode and workpiece electrode.

FIGURE 3 shows a diode 56 connected in the charge path of capacitor 12 with a silicon carbide cell 58 connected thereacross. A diode 60 is connected in the discharge path of capacitor 12 with a shunted silicon carbide cell 62. Diode 64 and a silicon carbide cell 66 are connected between the junction of controlled rectifier 22 with capacitor 12 and the positive terminal of D.C. source 10. This provides a clamping network for the charging of capacitor 12 to inhibit the capacitor from rising to a voltage that is a multiple of the source voltage. This network of diode 64 and silicon carbide cell 66 actually returns energy to source 10 as well as preventing excessive voltage multiplications. In a like manner and for a similar purpose, diode 68 and silicon carbide cell 70 are connected between the junction of controlled rectifier 22 with capacitor 12 and the negative terminal of source 10. Diode 68 and silicon carbide cell 70 thus act as a voltage limiting circuit that clamps the negative excursion of capacitor 12 to a preselected value.

FIGURE 4 is a schematic of the source of key control pulses 26 of FIGURE 1. Included are a flip-flop stage 72 and one-shot multivibrator stages 74 and 76. Flip-flop 72 comprises a pair of triodes 72a and 72b. The plates of triodes 72a and 72b are connected to a common source of D.C. potential through resistors 78 and 80, respectively. The cathodes of triodes 72a and 72b are connected to the positive terminal of a D.C. source 73. The grids of triodes 72a and 72b are connected to the negative terminal of D.C. source 73. The grids and plates of triodes 72a and 72b are cross coupled through RC networks 82–84 and 86–88, respectively, in a configuration well known in the art. Multivibrator 74 has its grid connected to the output of the plate of triode 72a through RC differentiator coupling network 90–94, blocking capacitor 96 and resistor 92. One-shot multivibrator 74 further includes a pair of triodes 74a and 74b. The plates of triodes 74a and 74b are connected to a common positive DC potential through resistors 98 and 100, respectively. The grid of triode 74a is coupled to the plate of triode 74b through coupling capacitor 102 and a potentiometer 104 is included in the grid voltage supply and connected to grid bias resistor 105 to selectively vary the pulse width of the output pulses taken from the plate of triode 74a. The cathodes of triodes 74a and 74b are connected to the common source of potential through the resistor element of potentiometer 104. One-shot multivibrator 76 comprises a pair of triodes 76a and 76b and is essentially similar in its components and circuit arrangement to multivibrator 74. Multivibrator 76 is connected to the output from the plate of triode 72b through an RC differentiator coupling network 106–110, blocking capacitor 112 and resistor 108. Triodes 76a and 76b have their plates connected to a common positive DC source through resistors 114 and 116, respectively. Triode 76a has its grid connected to the plate of triode 76b through coupling capacitor 118. A potentiometer 121 is included in the grid voltage supply of triode 76a and connected to grid bias resistor 123 to selectively vary the pulse width of the output pulses taken from the plate of triode 74b. The cathodes of 76a and 76b are connected to the common source of potential through the resistor element of potentiometer 121. The mode of operation of the circuit of FIGURE 4 now becomes apparent. A train of positive trigger pulses of predetermined frequency are introduced through diode 120 and blocking capacitor 122 to the grid of triode 72b and through diode 124 and blocking capacitor 126 to the grid of triode 72a. Flip-flop 72 has two stable states. In one stable state triode 72a is conducting and, in the other, triode 72b is conducting. Upon application of the trigger pulses, the nonconducting tube conducts and the conducting tube ceases to conduct. The output pulses are essentially square wave pulses, those taken from the plate of triode 72a being 180° out of phase with those taken from the plate of triode 72b. The square wave pulses from flip-flop 72 are differentiated into peaked trigger pulses by the RC coupling networks between flip-flop 72 and multivibrators 74 and 76, respectively. Multivibrators 74 and 76 are driven by the trigger pulses from flip-flop 72 to provide trains of square wave trigger pulses of selected width through leads 26a and 26b. Included in leads 26a and 26b are blocking capacitors 75a and 75b, respectively. The output of transformer stage 77 are connected through leads 24c, d and 24e, f to key or render conductive controlled rectifiers 22 and 24 as shown in FIGURE 1. The condition imposed on the source of keying pulses 26 that the keying pulses be equally spaced and alternately supplied to controlled rectifiers 22 and 24 has been complied with.

DESCRIPTION OF OPERATION

The operation of the circuits of FIGURES 1–3 will now be considered with particular reference to be made to the waveform of FIGURES 5–7 to clarify the mode of operation. FIGURE 1 illustrates a simple embodiment of the present invention. From the arrangement of the circuit elements it is apparent that current flow will pass from source 10 into the energy storage capacitor 12 when controlled rectifier 22 is switched on by a keying pulse from the source of keying pulses 26. The rate at which capacitor 12 charges is determined by the resonant frequency of inductance 20 and capacitor 12. Since the controlled rectifier 22 can carry current in only one direction, the voltage across capacitor 12 will rise to a voltage in excess of the source 10. This feature is utilized to advantage in controlled rectifier turnoff. The sequence of events normally occurring begins with the trigger pulse from source 26. When the action of inductance 20 is complete, capacitor 12 is charged in excess of the source voltage, controlled rectifier 22 is back biased and becomes non-conductive. Capacitor 12 now can begin to discharge when controlled rectifier 24 receives a keying pulse. The resultant current flow through resistor 27 serves to produce a voltage drop across resistor 27 and across the gap to permit early ionization of the dielectric and passage of a machining pulse between the electrode 14 and workpiece 18. The action of inductance 21 will cause capacitor 12 to be charged to a reverse potential thereby back biasing and turning off controlled rectifier 24 upon the collapse of the field of inductance 21. The triggering pulse to both controlled rectifiers 22 and 24 is of short duration to permit recovery immediately when reverse anode voltage is applied across the controlled rectifiers. When a keying pulse is again applied to the gate 22g of controlled rectifier 22, the cycle will be repeated. The circuit of FIGURE 1 provides a uniform current machining pulse source with the desired reverse voltage conditions present to assist and assure restoration of controlled rectifiers 22 and 24 to their normal nonconductive mode at the proper points in the cycle of operation. This assures the production of a train of machining pulses of precisely controlled width and spacing adapted to produce a uniform surface finish.

FIGURE 2 presents a combination of circuit elements that provides an essentially improved mode of operation over that of FIGURE 1. Controlled rectifier 22 charges energy storage capacitor 12 in series with inductance 20a in the same manner as was accomplished in FIGURE 1. Controlled rectifier 24 discharges storage capacitor 12 through a similar inductance 21a. However, in that the circuit of FIGURE 2, inductances 20a and 21a are embodied as equal turn primary windings of a pulse transformer 27 and inductance 28, which forms its secondary winding, is operatively connected to both. Inductance 28 is connected through a series diode 30 to the gap. The keying pulses to controlled rectifier 22 and 24 are displaced by 180 degrees in the manner employed in FIGURE 1. Controlled rectifier 22 continues as the result of the inductance 20a to receive the voltage doubling feature that insures its turn off after charging of capacitor 12. When controlled rectifier 24 discharges capacitor 12, the inductive effect of inductance 21a causes capacitor 12 to charge in a direction oppositely, to that of the charge placed on the capacitor through controlled rectifier 22. This voltage appearing across capacitor 12 caused the voltage across the anode-cathode terminals 24a and 24c to reverse and thus assures the turnoff of controlled rectifier 24. The inductances 20a and 21a are connected in a series adding voltage relationship. This connection produces current pulses in the inductance 28 that are in the same direction when capacitor 12 is charged by controlled rectifier 22 as when capacitor 12 is discharged by controlled rectifier 24. The circuit of FIGURE 2 therefor produces machining current impulses of the proper polarity during both the charging and discharging of capacitor 12. In other words, the present invention, while it employs the known advantage of inductive charging with voltage multiplication also has an arrangement which provides twice as many output pulses as could be obtained from the energy storage capacitors of previously employed spark machining circuits. To avoid and prevent the occurrence of transient spikes of negative voltage from appearing across the driven controlled rectifier at the end of their conductive states, protective networks incorporating shunted diodes, silicon carbide cells, and RC network combinations have been utilized as shown.

The circuit of FIGURE 3 has an operation basically similar to that of FIGURE 2 except for several important refinements. Diodes 56 and 60 have been added effectively in the charge and discharge paths of capacitor 12. Voltage multiplying conditions are present in the charging and discharging circuit of capacitor 12. It is apparent that, if the source voltage is, for example, 100 volts, and there is a zero voltage charge on capacitor 12, the doubling action of the circuit would cause the capacitor to charge to 200 volts under optimum conditions. If, for example, after the discharge of capacitor 12 there is a negative charge on capacitor 12 of the order of 20 volts, this voltage is now in series with the source voltage and the next charging action of the circuit would cause the capacitor on the next charge cycle to charge to twice the source voltage of 100 volts plus twice 20 volts, the charge remaining on the capacitor. If capacitor 12 is now discharged from a voltage of 240 volts, rather than a voltage of 200 volts, it will necessarily produce a larger negative voltage across capacitor 12. This multiplication of voltage would continue until the circuit losses would stabilize the voltage rise. The voltages to which capacitor 12 would charge would reach a higher and higher level. This condition is undesirable in electrical discharge machining for a number of reasons. It would produce secondary or output pulses from inductance 28 of varying peak currents depending upon the voltage to which capacitor 12 is charged. This will result in a wide variation of machined oversized and irregular workpiece surface finish. It could, in addition, allow voltage multiplication to rise to levels that impose transients across controlled rectifiers 22 and 24 other circuit elements in excess of their voltage rating and would cause their early failure. To prevent this undesirable voltage multiplication and to eliminate excessive voltage excursions from appearing across the controlled rectifier, modification of the circuit of FIGURE 2 has been made. A clamping circuit has been added which assures the fixing of the level of the voltages which can appear across capacitor 12 in excess of the voltage of the source on the charge and discharge cycles. Diode 64 and silicon carbide cell 66 are connected in series between the junction of controlled rectifier 22 and capacitor 12. This forms a voltage limiting circuit that clamps the positive excursion of capacitor 12 to a predetermined level. In operation, this clamping circuit takes advantage of the property of the silicon carbide cell of conducting only a minute current until a given voltage has appeared across the cell. The current through the cell above this point increases exponentially with linear increases of voltage across the cell. For example, controlled rectifier 22 fires and capacitor 12 begins to charge. The silicon carbide cell 66 in series with diode 64 looks like an open circuit until the voltage across capacitor 12 exceeds the voltage of source 10. Silicon carbide cell 66 then begins to conduct current as the voltage across capacitor 12 rises above that of source 10. The current through silicon carbide cell 66 is thus proportional to the difference in value of the voltage of source 10 and the voltage across capacitor 12. The series combination of diode 64 and silicon carbide cell 66 thus serves to return electrical energy to source 10. This action prevents the voltage across capacitor 12 from rising to a voltage level that is an undesired multiple of source voltage and allows the capacitor voltage to rise only to the source 10 voltage plus the voltage clipping level set by silicon carbide cell 66. The circuit of FIGURE 3, while it maintains voltage excursions to within predetermined boundaries, permits sufficient voltage multiplication to assure the turn off of controlled rectifier 22. Diode 68 in series with silicon carbide cell 70 performs the same voltage limiting function when controlled rectifier 24 fires to discharge capacitor 12. Silicon carbide cell 70 allows the capacitor 12 to charge negatively as a result of the tendency of inductance 21a and capacitor 12 to oscillate but limits the amount of the oscillatory negative half cycle voltage excursion.

Now, with reference to FIGURES 5-7, the operation of the preferred embodiment of the present invention as shown in FIGURE 3 will be examined. FIGURE 5 shows the voltage across controlled rectifier 22 in dash line form and that across controlled rectifier 24 in solid line form. The various voltage and current waveforms in FIGURES 5-7 are plotted to approximately the same scale with respect to the abscissa. At time $t_0$, controlled rectifier 22 is off and controlled rectifier 24 has been keyed conductive by a pulse from keying source 26 applied to its gating terminal 24g. Capacitor 12, which is charged in excess of the voltage of source 10, begins to discharge through controlled rectifier 24 in the manner shown in FIGURE 6. During the discharge of capacitor 12, current flow through the driving primary winding inductance 20a induces a pulse of current through secondary winding inductance 28 and a machining current impulse of the form shown in FIGURE 7 is transmitted across the gap. At time $t_1$, capacitor 12 has charged negatively to reverse bias controlled rectifier 24 and turn it off. During the time interval between $t_1$ and $t_2$, capacitor 12 remains substantially charged to its maximum negative voltage. The small slope of the capacitor voltage is due to the bleeder effect of non-linear resistance 38. At time $t_2$, a keying pulse to the gate 22g of controlled rectifier 22 renders it conductive and capacitor 12 begins to charge through controlled rectifier 22 and inductance 20a, inducing a second machining current pulse to the gap as shown in FIGURE 7. At time $t_3$, the voltage on capacitor 12 has reached its maximum positive swing, controlled rectifier 22 is back biased to turn it off and the current impulse to the gap is terminated as shown in FIGURE 7. Between $t_3$ and $t_4$, capacitor 12 remains charged positively and both controlled rectifiers remain in their normally non-conductive state. At time $t_4$, upon receipt of a keying pulse, controlled rectifier 24 will again be rendered conductive and the cycle of operation is repeated. The present invention has heretofore been described with reference to a machining power circuit with a single unidirectional switching means in the charge path of the energy storage means and a single unidirectional switching means connected in the discharge path of the energy storage means. By inclusion of two or more switching means together with appropriate primary windings in each path and appropriate modification of the keying pulse source 26 to provide sequential multiplied triggering, the pulse output rate may further be multiplied as desired.

It will thus be seen that, by the present invention, I have provided an improved machining power circuit for electrical discharge machining which is capable of providing voltage multiplication with appreciable energy recovery and operating at a pulse repetition rate at least twice that obtainable from a normal capacitor discharge circuit since both charging and discharging currents produce secondary cutting current impulses. It will further be seen that the circuit of the present invention is particularly adapted to the production of machining current impulses of uniform amplitude, spacing, and duration to provide a substantial advancement in the electrical discharge machining art. It should be further noted that the present power circuit without limitation to its utilization in electrical discharge machining apparatus is readily adaptable for use in induction heating apparatus, ignition systems and the like. Without regard to the low voltage output requirement of electrical discharge machining, the power circuit of the present invention is particularly suitable for any such use in which a uniform current density and constant energy content in each pulse is required to be provided to the load.

I claim as my invention:

1. A machining power circuit for machining a conductive workpiece by an electrode spaced therefrom by a dielectric coolant filled gap comprising a source of direct current potential, an energy storage means operatively connected thereacross and across the gap, a first unidirectional switching means of the grid controlled type connected intermediate said source and said energy storage means, a second unidirectional switching means of the grid controlled type connected intermediate said energy storage means and the gap, means for alternately activating said first and second switching means in time phased relationship with the charging and discharging of said storage means and inductive means operatively connected to each of said switching means and said energy storage means for deriving a rapid turn-off bias therefor.

2. A machining power circuit for machining a conductive workpiece by an electrode spaced therefrom by a dielectric coolant filled gap comprising a source of direct current potential, an energy storage means operatively connected thereacross, a first unidirectional switching means and a charging impedance serially connected between said source and said storage means, a second unidirectional switching means and a discharging impedance connected between said storage means and the gap, means for rendering said first and second switching means conductive during the charging and discharging of said energy storage means, respectively, and impedance means operable to render said first and second switching means non-conductive, respectively, by reversal of potential across said storage means during its charging and discharging cycles.

3. A machining power circuit for machining a conductive workpiece by time-spaced current impulse comprising a power source, a capacitor operatively connected across said source, a machining electrode and a workpiece operatively connected across said capacitor but spaced by a dielectric coolant filled gap, a first forwardly poled controlled rectifier and an inductance connected between said source and one terminal of said capacitor, a second forwardly poled controlled rectifier and an inductance connected between said terminal of said capacitor and the gap, means comprising a source of keying pulses for alternately rendering said first and second controlled rectifiers conductive, each of said inductances operable to provide a turn-off reverse voltage bias for its associated controlled rectifier subsequent to its being rendered conductive.

4. A machining power circuit for machining a conductive workpiece by machining current impulses comprising a power source, a first unidirectional switching means and a first inductance connected in series with a capacitor across said source, a second unidirectional switching means and a second inductance connected across said capacitor, a third inductance inductively coupled to both the aforesaid first and second inductances, an electrode separated from the workpiece by a dielectric filled gap, said electrode and the workpiece operatively connected across said third inductance, and means for alternately activating said first and second switching means to provide impulses across said gap.

5. A machining power circuit for machining a conductive workpiece by time-spaced current impulses comprising a source of direct current potential, a capacitor operatively connected across said source, a first unidirectional switching means and a first transformer primary winding connected in series between said source and said capacitor, a second unidirectional switching means and a second transformer primary serially connected across said capacitor, a transformer secondary winding, an electrode separated from the workpiece by a dielectric filled gap, said electrode and the workpiece connected across said transformer secondary winding, and means for alternately activating said first and second switching means.

6. The combination as set forth in claim 5 in which each of said transformer primary windings includes an uncoupled inductance.

7. A machining power circuit for machining a conductive workpiece by time-spaced current impulses comprising a source of direct current potential, a capacitor operatively connected across said source, a first unidirectional switching means and a first inductance connected in series with said capacitor, a second unidirectional switching means and a second inductance connected across said capacitor, a third inductance magnetically coupled to said first and second inductances, an electrode separated from the workpiece by a dielectric filled gap, said electrode and the workpiece connected across said third inductance, a unidirectional current conducting device connected between said third inductance and the gap, and means for alternately activating said first and second switching means.

8. A machining power circuit for machining a conductive workpiece by time-spaced current impulses comprising a source of direct current potential, a capacitor operatively connected across said source, a first unidirectional switching means and a first inductance connected in series with said capacitor, a second unidirectional switching means and a second inductance serially connected across said capacitor, said first and second inductances being core wound and of like polarity with said unidirectional switching means, a third inductance magnetically coupled to said first and second inductances, an electrode separated from the workpiece by a dielectric filled gap, said electrode and the workpiece connected across said third inductance, and means for alternately activating said first and second switching means.

9. The combination as set forth in claim 8 in which a means is operatively connected to said capacitor for limiting the overchange thereof.

10. The combination as set forth in claim 9 in which said limiting means comprises a pair of oppositely phased clipping diodes, each connected between a common plate of said capacitor and a different terminal of said source.

11. A machining power circuit for providing time-spaced current impulses across a dielectric filled gap between a pair of electrodes comprising a power source, a capacitor operatively connected across said source, a first controlled rectifier and a first inductance connected in series with said capacitor across said source, a second controlled rectifier and a second inductance connected across said capacitor, a third inductance magnetically coupled to said first and second inductance and operatively connected to the gap, and means for alternately activating said first and second switching means in time phased relationship with the charging and discharging of said capacitor.

12. The combination as set forth in claim 11 in which said means for alternately activating said first and second controlled rectifiers comprises a source of alternate, equally-spaced keying pulses connected to the gating terminals of said controlled rectifiers.

13. The combination as set forth in claim 11 in which said first and second inductances are core wound with a phasing corresponding to that of said first and second controlled rectifiers.

14. In an electrical discharge machining apparatus for machining a conductive workpiece by a tool electrode across a dielectric coolant filled gap, a source of power, a capacitor operatively connected across said source, a first controlled rectifier having a pair of principal electrodes and a gate electrode, said first control rectifier having its principal electrodes connected in series with a first transformer primary winding between said source and said capacitor, a second controlled rectifier having a pair of principal electrodes and a gate electrode, said second controlled rectifier having its principal electrodes connected in series with a different transformer primary winding across said capacitor, a transformer secondary winding operatively connected across said gap, means for alternately activating said first and second controlled rectifiers to provide discharges across said gap by applying triggering pulses to their respective gate electrodes.

15. In an electrical discharge machining apparatus for machining a conductive workpiece by a tool electrode across a dielectric coolant filled gap, a source of power, a capacitor operatively connected across said source and operatively connected to said gap, a first controlled rectifier having a pair of principal electrodes and a gate electrode, said controlled rectifier having its principal electrodes connected intermediate said source and said capacitor, a second controlled rectifier having a pair of principal electrodes and a gate electrode, said second controlled rectifier having its principal electrodes connected intermediate said capacitor and said gap, means for alternately applying turn-on triggering pulses to the gate electrodes of said controlled rectifiers for providing capacitor charge and capacitor discharge across said gap, and means operatively connected to each of said controlled rectifiers for back-biasing it off subsequent to turn-on.

16. The combination as set forth in claim 15 in which said last mentioned means comprises an inductance in series with the principal electrodes of each of said controlled rectifiers for causing said capacitor to charge to a reverse voltage.

References Cited

UNITED STATES PATENTS

| 2,235,385 | 3/1941 | Rava | 315—241 X |
| 2,952,818 | 9/1960 | Russell et al. | 331—113 |
| 3,015,739 | 1/1962 | Manteuffel | 307—885 |

FOREIGN PATENTS

| 1,303,552 | 8/1962 | France. |

JOSEPH V. TRUHE, Primary Examiner

R. F. STAUBLY, Assistant Examiner

U.S. Cl. X.R.

219—113; 315—243; 331—111

PO-1050
(5/69)

UNITED STATES PATENT OFFICE
CERTIFICATE OF CORRECTION

Patent No. 3,485,987　　　　　　　　Dated December 23, 1969

Inventor(s) Cecil P. Porterfield

It is certified that error appears in the above-identified patent and that said Letters Patent are hereby corrected as shown below:

In the claims, Claim 9, Column 9, Line 67, the word "overchange" should read --overcharge--.

SIGNED AND SEALED
OCT 6 - 1970

(SEAL)
Attest:

Edward M. Fletcher, Jr.
Attesting Officer

WILLIAM E. SCHUYLER, JR.
Commissioner of Patents